United States Patent
Marciano et al.

(10) Patent No.: US 10,005,011 B2
(45) Date of Patent: Jun. 26, 2018

(54) VELOCITY REDUCING POOL FILTER PORT

(71) Applicant: Hayward Industries, Inc., Elizabeth, NJ (US)

(72) Inventors: Edward Lawrence Marciano, Lexington, NC (US); Joseph Anthony Tessitore, Clemmons, SC (US)

(73) Assignee: Hayward Industries, Inc., Elizabeth, NJ (US)

( * ) Notice: Subject to any disclaimer, the term of this patent is extended or adjusted under 35 U.S.C. 154(b) by 389 days.

(21) Appl. No.: 14/526,299

(22) Filed: Oct. 28, 2014

(65) Prior Publication Data
US 2015/0114915 A1   Apr. 30, 2015

Related U.S. Application Data

(60) Provisional application No. 61/896,640, filed on Oct. 28, 2013.

(51) Int. Cl.
| | | |
|---|---|---|
| *B01D 29/90* | (2006.01) | |
| *B01D 35/02* | (2006.01) | |
| *B01D 35/30* | (2006.01) | |
| *B01D 29/92* | (2006.01) | |
| *C02F 1/00* | (2006.01) | |
| *E04H 4/12* | (2006.01) | |
| *C02F 103/42* | (2006.01) | |

(52) U.S. Cl.
CPC ........... *B01D 29/908* (2013.01); *B01D 29/92* (2013.01); *B01D 35/02* (2013.01); *B01D 35/30* (2013.01);
(Continued)

(58) Field of Classification Search
CPC ...... B01D 29/908; B01D 35/02; B01D 35/30; B01D 29/92; C02F 1/004; C02F 2103/42; E04H 4/1209
See application file for complete search history.

(56) References Cited

U.S. PATENT DOCUMENTS

| | | |
|---|---|---|
| 6,314,983 B1 | 11/2001 | Hatch |
| 2009/0025812 A1 | 1/2009 | Campbell et al. |

(Continued)

FOREIGN PATENT DOCUMENTS

| | | |
|---|---|---|
| CN | 2480040 Y | 3/2002 |
| CN | 1726333 A | 1/2006 |

(Continued)

OTHER PUBLICATIONS

The Chapter I International Preliminary Report on Patentability for PCT/US2014/062721, dated May 3, 2016.*
International Search Report dated Mar. 20, 2015, issued in connection with Internatioanl Application No. PCT/US2014/062721 (6 pages).

(Continued)

*Primary Examiner* — David A Reifsnyder
(74) *Attorney, Agent, or Firm* — McCarter & English, LLP

(57) ABSTRACT

A velocity reducing filter port is provided herein. More specifically, provided herein is a pool filter comprising a filter housing having a sidewall and a bottom wall defining an inner chamber, an inlet section positioned in the sidewall of the filter housing, an outlet section positioned in the sidewall of the filter housing, and a flow controller attached to the inlet section, the flow controller having a flow controller inlet, a flow controller outlet, and a wall therebetween, wherein the flow controller inlet has an inlet cross-sectional area and the flow controller outlet has an outlet cross-sectional area greater than the inlet cross-sectional area.

27 Claims, 13 Drawing Sheets

(52) U.S. Cl.
CPC ........... *C02F 1/004* (2013.01); *E04H 4/1209* (2013.01); *C02F 2103/42* (2013.01); *C02F 2301/026* (2013.01)

(56) References Cited

U.S. PATENT DOCUMENTS

| | | | |
|---|---|---|---|
| 2011/0062068 A1* | 3/2011 | Nibler | C02F 1/001 210/167.12 |
| 2011/0225717 A1 | 9/2011 | Malinasky, Jr. | |
| 2012/0273004 A1 | 11/2012 | Erlich et al. | |

FOREIGN PATENT DOCUMENTS

| | | |
|---|---|---|
| CN | 201164758 Y | 12/2008 |
| CN | 101707916 A | 5/2010 |
| CN | 103079670 A | 5/2013 |

OTHER PUBLICATIONS

Written Opinion of the International Searching Authority dated Mar. 20, 2015, issued in connection with International Application No. PCT/US2014/062721 (5 pages).

Translation of first Chinese Office Action dated Apr. 28, 2017 in connection with Chinese Patent Application No. 201480059517.6 (8 pages).

Extended European Search Report dated Jun. 27, 2017 in connection with European Patent Application No. 14858123.4 (7 pages).

Examination Report No. 1 for Standard Patent Application dated Nov. 21, 2017 in connection with Australian Application No. 2014342497 (3 pages).

Notification that Application Is Deemed to be Withdrawn dated Nov. 17, 2017 from the SIPO in connection with Chinese Application No. 201480059517.6 (1 page).

* cited by examiner

VELOCITY REDUCING POOL FILTER PORT

CROSS-REFERENCE TO RELATED APPLICATIONS

The present application claims the benefit of priority to U.S. Provisional Patent Application No. 61/896,640, filed Oct. 28, 2013, the contents of which are incorporated herein by reference in their entirety for all purposes.

BACKGROUND

Field of the Disclosure

The present disclosure relates generally to a velocity reducing tangential port for a pool filter.

Related Art

Pool filters typically experience a pressure drop across the filter housing as water enters and exits through the fluid inlet and outlet of the housing. This pressure drop decreases the hydraulic efficiency and effectiveness of the filter and increases the energy required to operate the pool pump. Minimizing this pressure drop by decreasing fluid pressure within a pool filter is often difficult because of pool filter manufacturing difficulties (e.g., a 2.4 inch inlet of the pool filter typically receives 2 inch plumbing) and plumbing infrastructure limitations (e.g., many pools have 2 inch plumbing around a pool when obtaining the same pressure drop would require 4 inch plumbing around the pool).

Therefore, it would be desirable to provide a filter housing that reduces the pressure drop in a filter and improves filter performance.

SUMMARY

The present disclosure relates to a velocity reducing tangential port for a pool filter. The velocity reducing port of the filter housing slows the velocity of the fluid flow entering a pool filter (e.g., cartridge pool filter) by increasing the cross-sectional area (e.g., diameter) of the inlet port, such that as the fluid flow enters the inlet of the filter, the pressure drop incurred by the filter is reduced. By reducing the pressure drop of the filter, the hydraulic efficiency of the filter is increased, and the energy required to operate the pool pump is reduced. Further, in some embodiments, the filter housing could include a diversion shield to divert the flow of water and protect the filter cartridge from direct fluid flow, thereby extending the useful life of the filter cartridge.

In other embodiments, a method for filtering fluid is provided. The method for filtering fluid comprising providing a pool filter including: (a) a filter housing having a sidewall and a bottom wall defining an inner chamber, (b) an inlet section positioned in the sidewall of the filter housing, (c) an outlet section positioned in the sidewall of the filter housing, (d) a first flow controller attached to the inlet section, the first flow controller having a first flow controller inlet, a first flow controller outlet, and a first wall therebetween, wherein the first flow controller inlet has a first flow controller inlet cross-sectional area and the first flow controller outlet has a first flow controller outlet cross-sectional area greater than the first inlet cross-sectional area, and (e) a second flow controller attached to the outlet section, the second flow controller having a second flow controller inlet, a second flow controller outlet, and a second wall therebetween, wherein the second flow controller inlet has a second flow controller inlet cross-sectional area and the second flow controller outlet has a second flow controller outlet cross-sectional area smaller than the second inlet cross-sectional area, attaching the first flow controller inlet to a first pipe in fluid communication with a pool, the first pipe having a first pipe outlet cross-sectional area less than the first flow controller outlet cross-sectional area, attaching the second flow controller outlet to a second pipe in fluid communication with the pool, the second pipe having a second pipe inlet cross-sectional area less than the second flow controller inlet cross-sectional area, and filtering fluid through the pool filter from the first pipe to the second pipe. In some embodiments, the inlet section is tangentially positioned in the sidewall of the filter housing thereby creating a rotating fluid flow within the inner chamber of the filter housing of the pool filter when fluid is filtered through the pool filter.

BRIEF DESCRIPTION OF THE DRAWINGS

The foregoing features of the disclosure will be apparent from the following Detailed Description, taken in connection with the accompanying drawings, in which.

DETAILED DESCRIPTION

The present disclosure relates to a velocity reducing tangential port for a filter housing, as discussed in detail below in connection with FIGS. 1-17. The velocity reducing tangential port reduces the speed at which flow enters a pool filter to reduce the pressure drop across the entire filter. The port improves the hydraulic efficiency of the filter and improves the distribution of filtered particles on the surface of the filter media. Although the velocity reducing tangential port is specifically disclosed for use with a pool filter housing, the port and related disclosure thereof could be implemented in any product or design where fluid flow changes direction and maximizing hydraulic efficiency is desired. The filter housing of the disclosure could be manufactured by any suitable manufacturing process, including secondary processes or specific processes (e.g., molding, blow molding, advance molding/manufacturing techniques, etc.).

Figure 1:
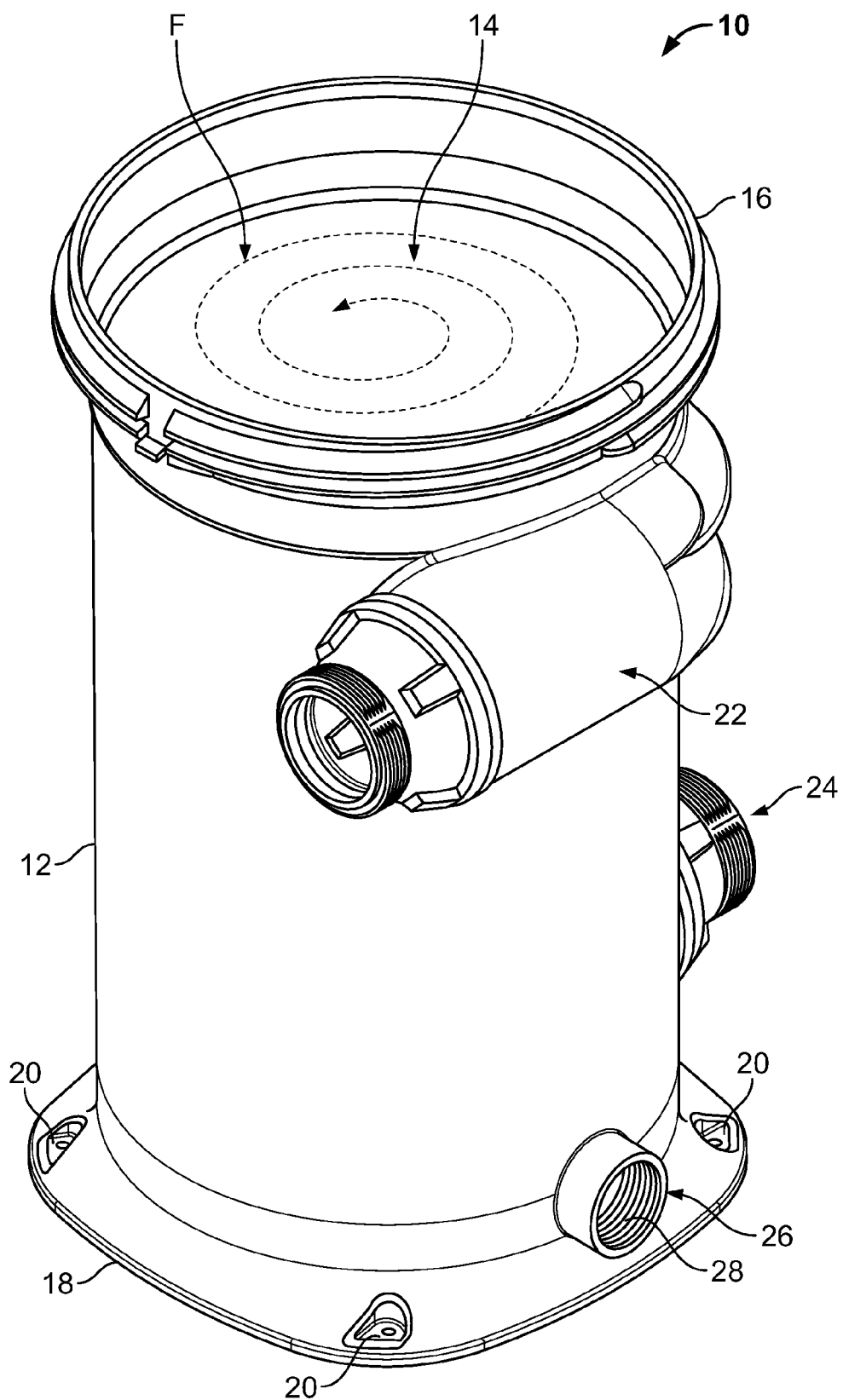
FIG. 1 is a front perspective view of the pool filter housing of the present disclosure.
Figure 2:
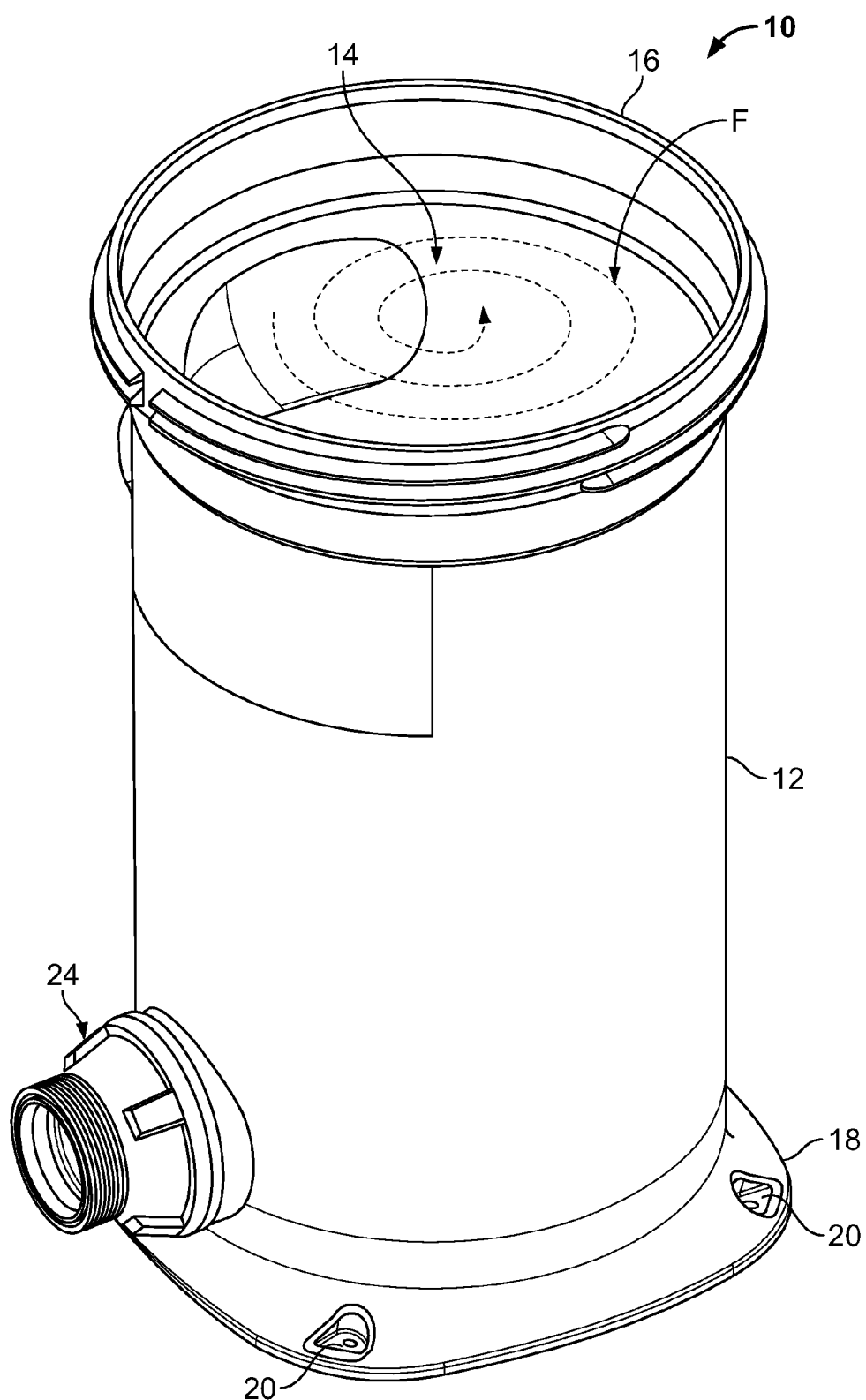
FIG. 2 is another perspective view of the pool filter housing.

FIGS. 1-2 are perspective views of the pool filter housing 10 of the present disclosure. The filter housing 10 includes a cylindrical sidewall 12 defining an inner chamber 14. The cylindrical sidewall 12 has a threaded portion 16 at the top exterior thereof (although the threaded portion could be on the interior of the sidewall instead). The threaded portion 16 allows for the removable application of a filter cover, thereby providing access to the inner chamber 14 of the filter housing 10 to add or remove a filter cartridge (e.g., filter media) therefrom. The filter housing 10 also includes a bottom wall (not shown) and a flange 18 at the bottom of the cylindrical side wall 12 for mounting and securing the filter housing 10 to a pool pad, for example. The flange 18 could include through holes 20 (e.g., threaded through holes) for mounting the filter housing 10.

Figure 3:
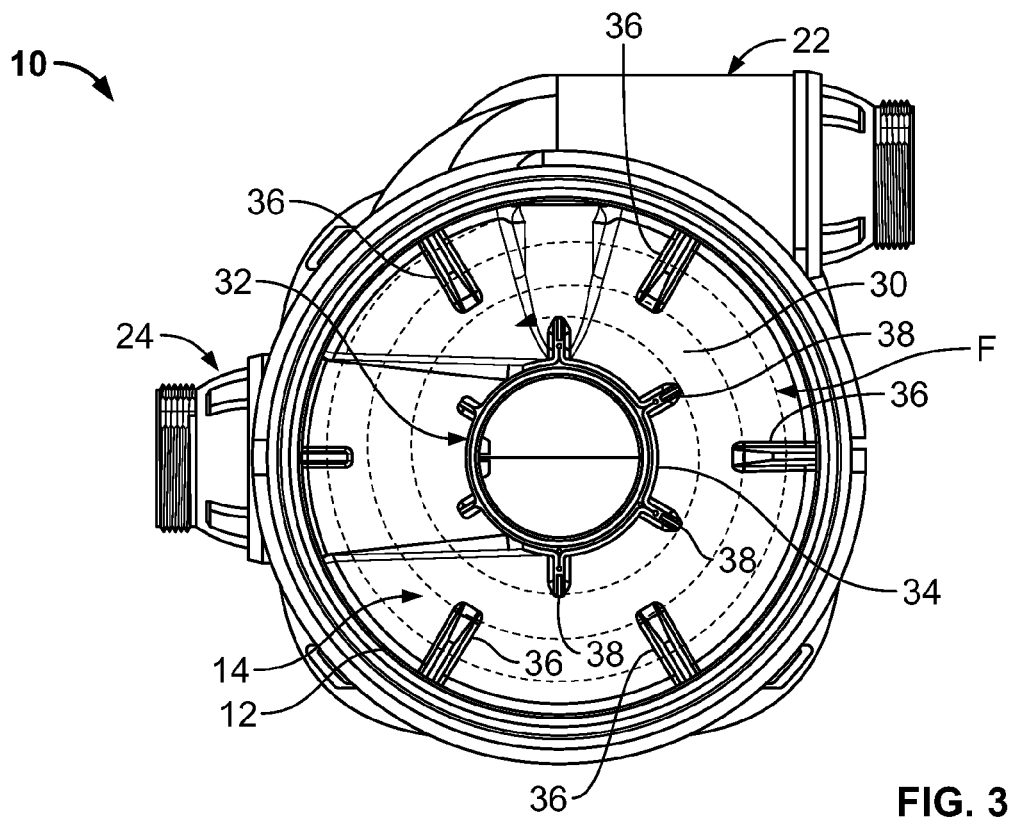
FIG. 3 is a top view of the pool filter housing.

The filter housing 10 further includes several ports directing fluid flow. More specifically, the filter housing 10 includes a tangential inlet section 22 (e.g., fluid inlet, inlet port, fluid inlet port, etc.) (discussed in more detail below), an outlet section 24 (e.g., fluid outlet, outlet port, fluid outlet port, etc.) (discussed in more detail below), and a drain port 26. The tangential inlet section 22 and radial outlet section 24 could connect to a pool circulation system (or any other fluid circulation system), such that the tangential inlet section 22 receives dirty water and the radial outlet section 24 dispenses clean water. The tangential inlet section 22 could create, for example, a rotating fluid flow (e.g., an inwardly spiraling and/or helical flow) within the filter housing 10. Referring to FIGS. 1-3 one example flow F shows an example shape of fluid flow that could be provided by the pool filter discussed herein. The example spiral flow F created by the tangential inlet section 22 allows the fluid to circulate around a filter medium (e.g., filter cartridge), rather than the fluid being propelled directly onto the filter medium. As explained below in more detail, the flow controller of the tangential inlet section 22 decreases the velocity of the fluid within the filter housing 10. Accordingly, in some embodiments, the example spiral flow F and/or the decreased velocity enhance even distribution of filter debris, enhance even distribution of pressure (see, for example, FIG. 14), increase the likelihood of capturing debris (e.g., by staying on the filter medium better), and decrease the likelihood of particles being pushed (e.g., forced) through the filter medium.

The drain port 26 protrudes radially from the cylindrical sidewall 12 and could include threading 28 on the interior (or exterior) surface thereof. The threading 28 could be to engage a drain plug cap, tube, pipe, etc. The drain port 26 is for draining the filter prior to its removal from a fluid circulation system, for example.

FIG. 3 is a top view of the pool filter housing 10 showing the interior thereof. As shown, the filter housing 10 includes a bottom wall 30 and an outlet channel 32 extending from the center of the bottom wall 30 into the interior of the filter housing 10. The outlet channel 32 includes a vertical circular sidewall 34 concentric with the cylindrical sidewall 12 of the filter housing 10. Further, the filter housing 10 includes a plurality of outer standoffs 36 extending from the bottom wall 30 and the interior of the circular sidewall 12, as well as a plurality of inner standoffs 38 extending from the bottom wall 30 and the outer surface of the circular sidewall 34 of the outlet channel 32. As shown below, the outer standoffs 36 and inner standoffs 38 support a filter cartridge inserted into the chamber 14 of the filter housing 10.

Figure 4:
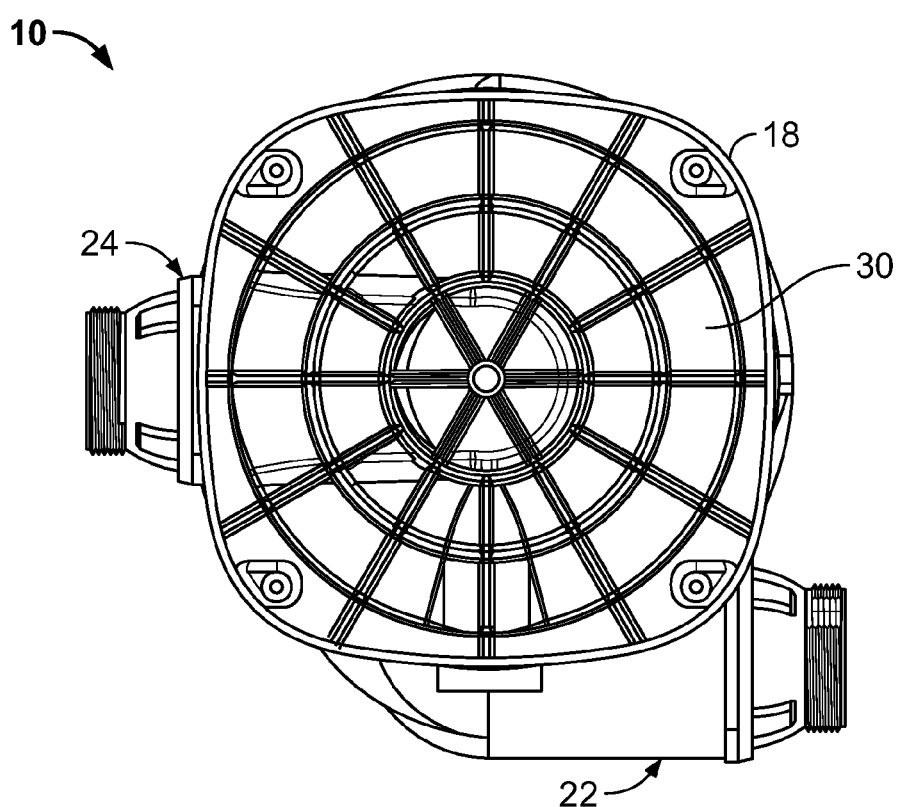
FIG. 4 is a bottom view of the pool filter housing.

FIG. 4 is a bottom view of the pool filter housing showing the exterior of the bottom wall 30 of the filter housing 10, as well as the bottom of the flange 18, tangential inlet section 22, and outlet section 24.

Figure 5:
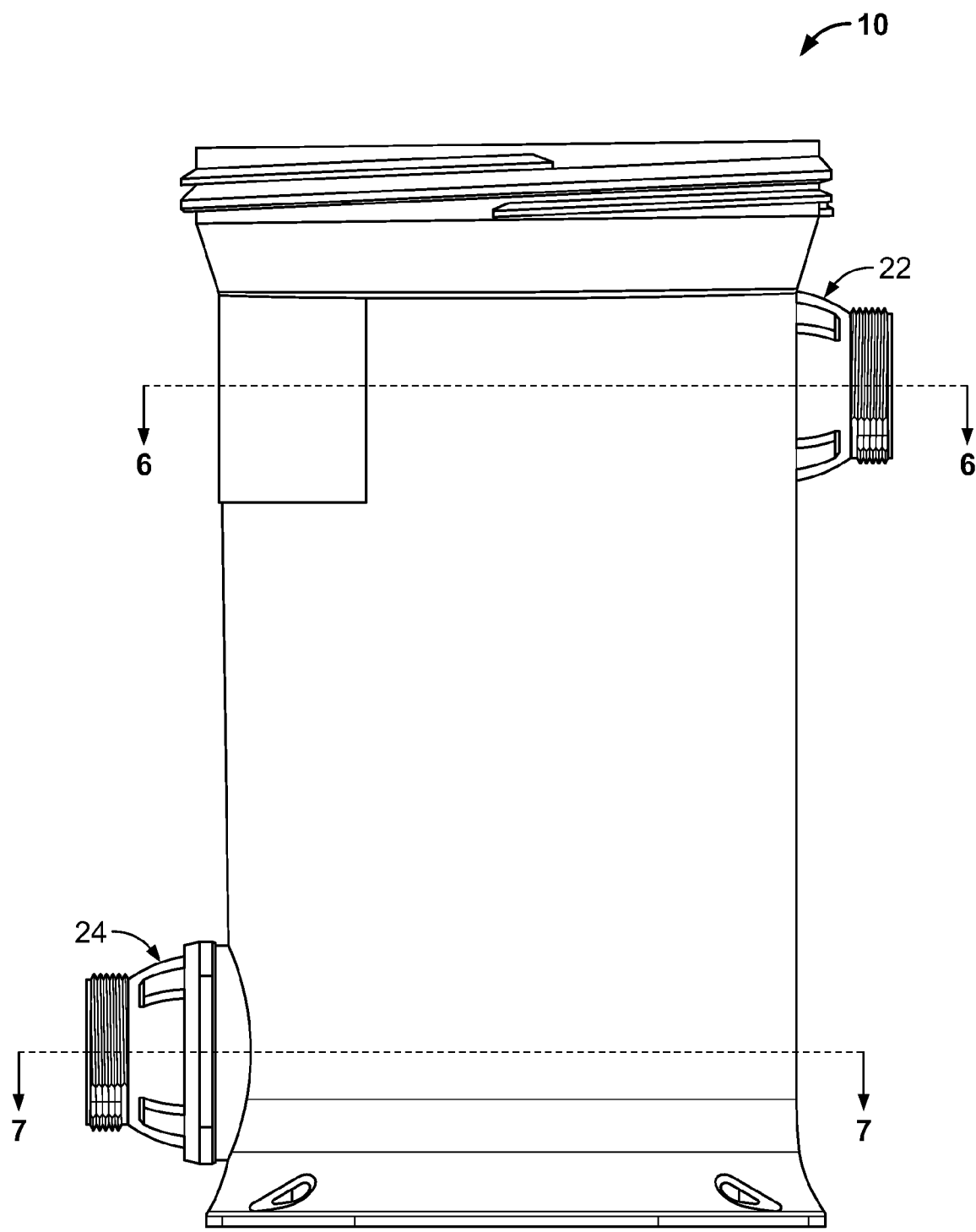
FIG. 5 is a left side view of the pool filter housing.

FIG. 5 is a left side view of the pool filter housing 10 showing the tangential inlet section 22 and outlet section 24.

Figure 6:
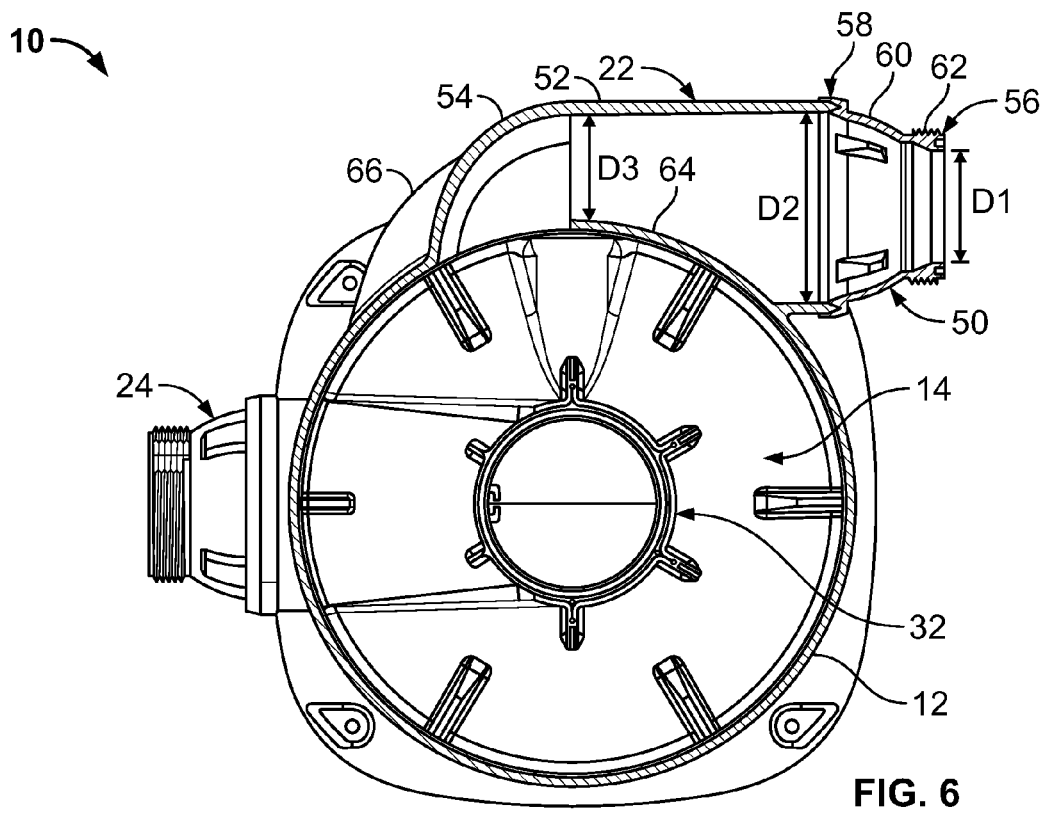
FIG. 6 is a sectional view of the pool filter housing taken along section line 6-6 of FIG. 5.

FIG. 6 is a sectional view of the pool filter housing 10 taken along section line 6-6 of FIG. 5. As shown, the tangential inlet section 22 is substantially tangential (e.g., normal) to the outer circumference of the cylindrical sidewall 12 (e.g., the center axis of the tangential inlet section is tangent to the outside of the cylindrical sidewall 12 of the filter housing 10), although the central axis of the tangential inlet section 22 could be offset from the tangent of the outer circumference of the cylindrical sidewall 12. The tangential inlet section 22 allows for the fluid flow to enter on the outside diameter of the cylindrical sidewall 12 of the filter housing 10 so that, in some embodiments, the flow preferably is not injected directly onto one area of the filter cartridge (e.g., filter media) and can be more evenly distributed across the entire filter cartridge surface. The tangential inlet section 22 slows the fluid flow to decrease energy loss when the flow turns into the inner chamber and decrease energy loss when the fluid flow interacts with the flow already moving within the filter. The tangential design and flow distribution preferably allows for the flow of unfiltered water to be more evenly distributed across the filter media surface, ensuring an extended usable life for the filter. However, the flow does not have to enter from the side of the filter housing 10, and could instead enter from the center (e.g., radial) or from any other location.

The tangential inlet section 22 includes a flow controller 50 (e.g., first flow controller), a straight portion 52, and a curved portion 54. The flow controller 50 has a flow controller inlet 56, flow controller outlet 58, and a tapered wall 60 therebetween (e.g., 20.3 degree angle taper). The flow controller inlet 56 includes threading 62 on the exterior surface thereof (although the threading 62 could be on the interior surface instead). The straight portion 52 and curved portion 54 extend tangentially from the cylindrical sidewall 12 of the fluid housing 10. The flow controller outlet 58 is connected to the straight portion 52 of the tangential inlet section 22, and could be connected together by any suitable means, such as welding (e.g., spin welding), threading, snap-on connection, etc. Additionally, the flow controller 50 could be formed integrally with the straight portion 52 of the tangential inlet section 22.

The diameter D1 (and cross-sectional area) of the flow controller inlet 56 (e.g., 2.4 inches) is smaller than the diameter D2 (and cross-sectional area) of the flow controller outlet 58 (e.g., 4.1 inches). As a result, as fluid flow enters the tangential inlet section 22, the diameter expansion of the flow controller 50 slows the velocity of the fluid so that the energy required to redirect the fluid around the inlet section 22 is reduced, thus improving hydraulic efficiency (e.g., causes less drag and less lost energy for the same volume flow as a smaller diameter port). The tangential inlet section increases in cross-sectional area and allows the flow to slow as it turns and enters the large filter volume.

Instead of increasing the diameter of the inlet port, a plurality of inlet ports could be used to increase the effective inlet area and improve the distribution of unfiltered flow. The plurality of inlet ports could be of any size and could have the same or differing diameters (or cross-sectional areas). In some embodiments, the diameter of the inlet port (e.g., inlet flow controller) could increase from one end to another end thereof. Any suitable means for increasing an effective inlet cross-sectional area may be provided, such as by increasing the inlet cross-sectional area of an inlet port (e.g., inlet flow controller), increasing the number of inlet ports provided, and/or a combination thereof.

The flow controller inlet 56 receives dirty water from the pool and the flow controller outlet 56 sends dirty water to the straight portion 52 for filtration. The fluid flows through the straight portion 52 until the flow is redirected by the curved portion 54 into the inner chamber 14 of the fluid housing 10. A diversion shield 64 extends into the interior of the straight portion 52 of the tangential inlet section 22 (following the same curvature as cylindrical wall 12). The diversion shield 64 inhibits direct fluid flow from the flow controller 50 onto the filter cartridge (thereby extending the useful life of the filter cartridge). The fluid then flows through the filter cartridge towards the center of the chamber 14 where it exits by outlet channel 32. Although embodiments of the diversion shield 64 may decrease the cross-sectional area of fluid flow between the diversion shield 64 and straight portion 52 (e.g., diameter D3), such can be compensated for by an elongated opening into the inner chamber 14 (discussed below).

Due to the nature of the design, much of the pressure from the fluid flow is exerted on the interior of the curved portion 54. As a result, support ribs 66 (or any other suitable structure) could be used to support the tangential inlet section 22 and provide additional strength to the inlet section 22 structure, where the support ribs 66 are attached to the exterior of the sidewall 12 and the exterior of the curved portion 54.

Figure 7:
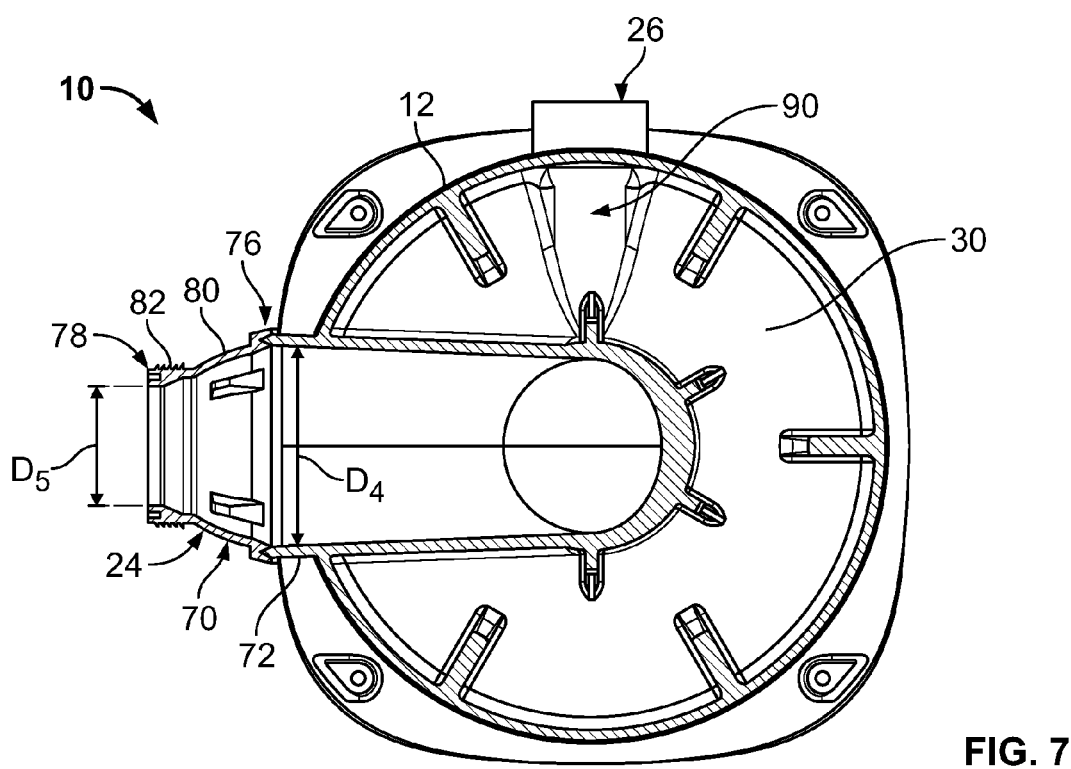
FIG. 7 is a sectional view of the pool filter housing taken along section line 7-7 of FIG. 5.

FIG. 7 is a sectional view of the pool filter housing taken along section line 7-7 of FIG. 5. The radial outlet section 22 includes a flow controller 70 (e.g., second flow controller) and a straight portion 72. The flow controller 70 has a flow controller inlet 76, flow controller outlet 78, and a tapered wall 80 therebetween (e.g., 20.3 degree angle taper). The flow controller outlet 78 includes threading 82 on the exterior surface thereof (although the threading 82 could be on the interior surface instead). The straight portion 72 extends radially from the cylindrical sidewall 12 of the fluid housing 10. The flow controller outlet 78 is connected to the straight portion 72 of the radial outlet section 24, and could be connected together by any suitable means, such as welding (e.g., spin welding), threading, snap-on connection, etc. Additionally, the flow controller 70 could be formed integrally with the straight portion 72 of the radial outlet section 24. The flow controller inlet 76 receives clean water from outlet channel 32 and the flow controller outlet 76 sends clean water back for recirculation to the pool.

The diameter D4 (and cross-sectional area) of the flow controller inlet 76 (e.g., 4.1 inches) is larger than the diameter D5 (and cross-sectional area) of the flow controller outlet 78 (e.g., 2.4 inches). Further, the bottom wall 30 includes channel 90 to divert the flow of water to drain port 26. Thus, the flow velocity speeds back up upon exiting flow controller outlet 58.

Figure 8:
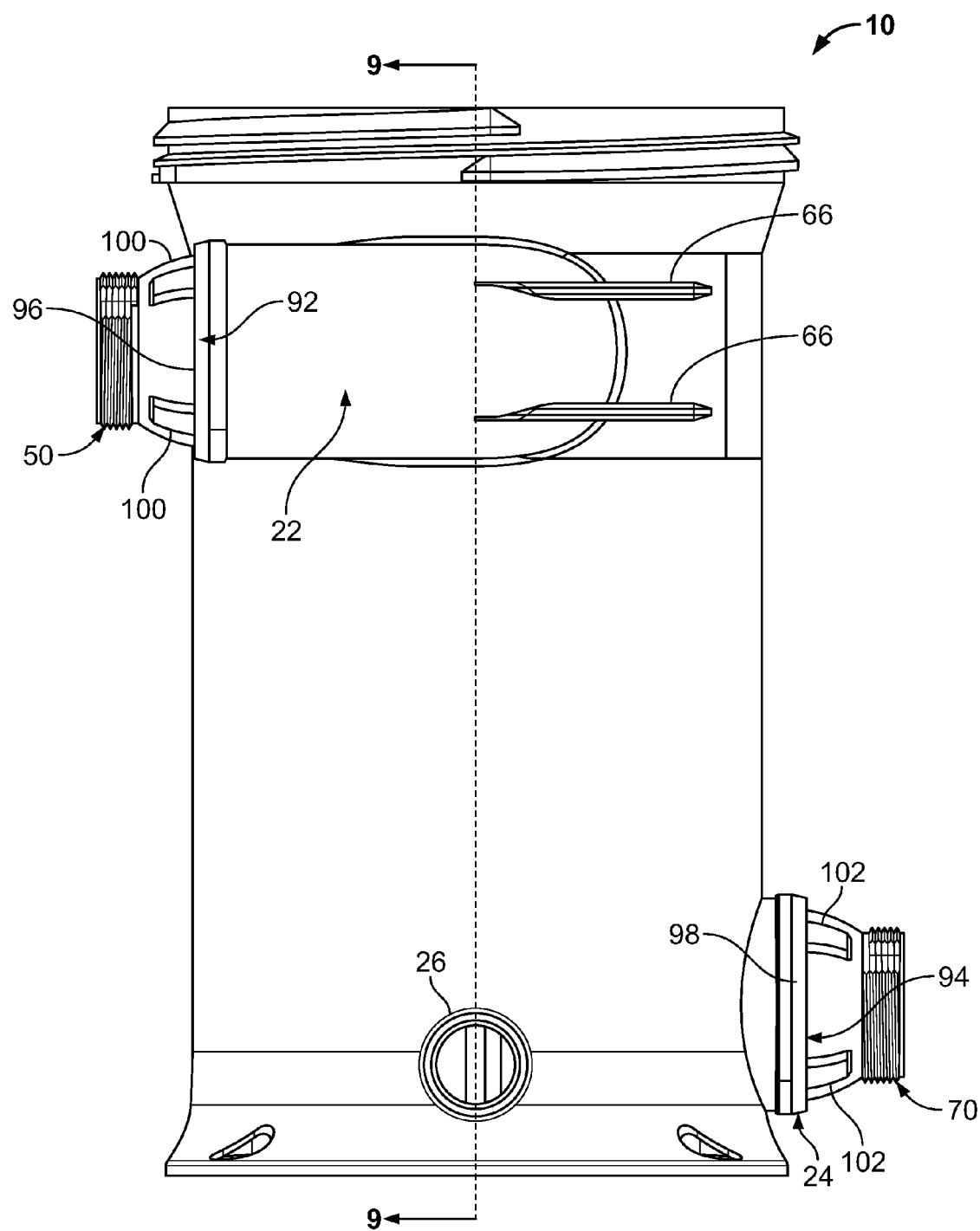
FIG. 8 is a right side view of the pool filter housing.

FIG. 8 is a right side view of the pool filter housing showing tangential inlet section 22, radial outlet section 24, support ribs 66, and drain port 26, as described above. As shown, each of the flow controllers 50, 70, further include an exterior protuberance 92, 94 integrally formed with the flow controllers 50, 70 (although the flanges could be separate components attached thereto). Each protuberance 92, 94 could include circumferentially extending portions 96, 98 that run along the circumference of the flow controller 50, 70, and longitudinally extending portions 100, 102 that run longitudinally along the flow controller 50, 70. The circumferentially extending portions 96, 98 and longitudinally extending portions 100, 102 could be provided in connection with spin welding the flow controllers 50, 70 onto the inlet section 22 and outlet section 24 (e.g., to provide torque during the application of the flow controllers 50, 70). For example, the circumferentially extending portions 96, 98 provide a surface for exerting radial force to apply the flow controller 50, 70 to the filter housing 10, and the longitudinally extending portions 100, 102 provide a surface for exerting circular force (e.g., torque) to apply the flow controller 50, 70 to the filter housing 10.

Figure 9:
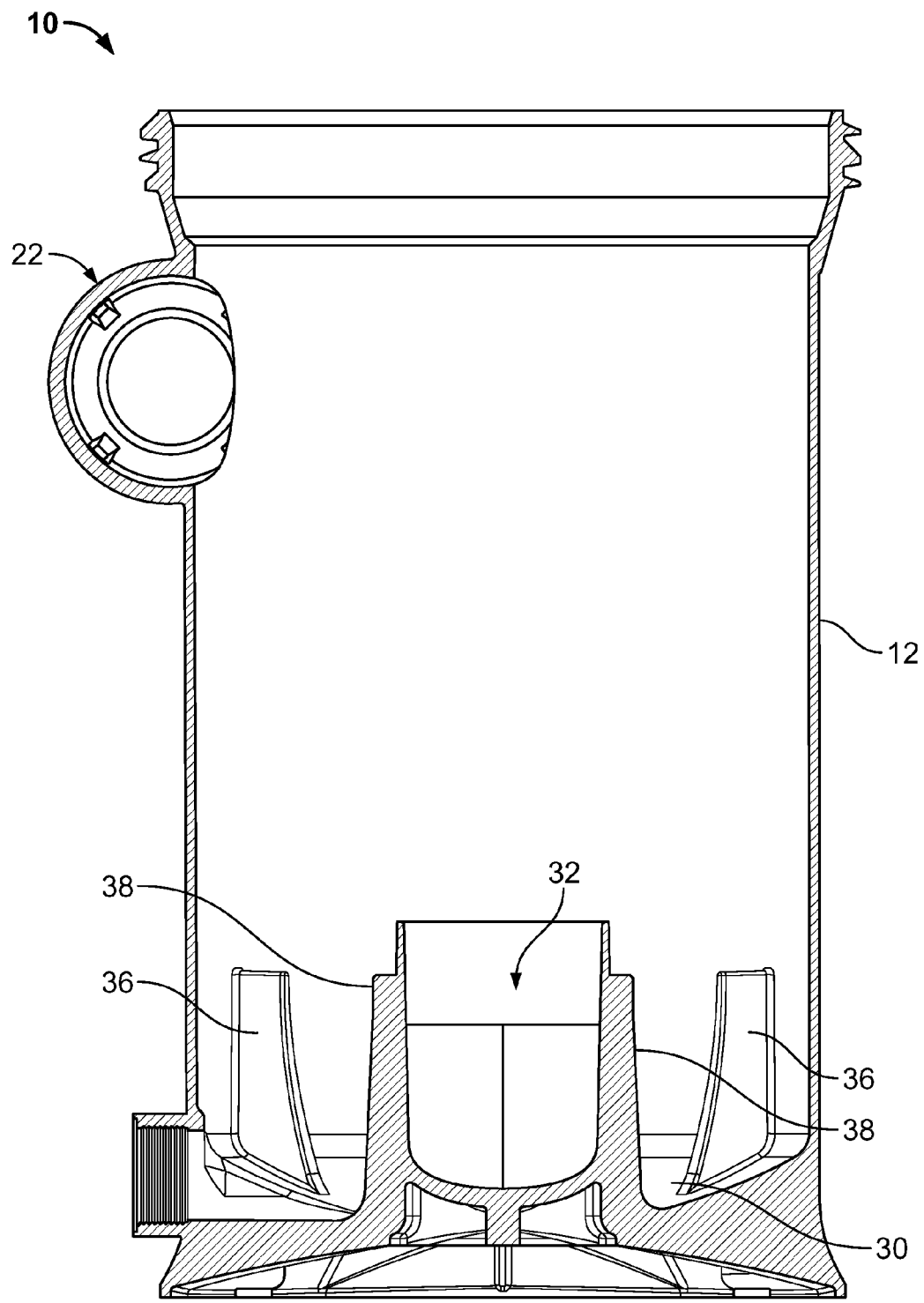
FIG. 9 is a sectional view of the pool filter housing taken along section line 9-9 of FIG. 8.

FIG. 9 is a sectional view of the pool filter housing 10 taken along section line 9-9 of FIG. 8. As described above, the outlet channel 32 extends vertically from the center of the bottom wall 30 into the interior of the filter housing 10. Further, the filter housing 10 includes a plurality of outer standoffs 36 extending from the bottom wall 30 and the interior of the circular sidewall 12, as well as a plurality of inner standoffs 38 extending from the bottom wall 30 and the outer surface of the circular sidewall 34 of the outlet channel 32. As shown below, the outer standoffs 36 and inner standoffs 38 support a filter cartridge inserted into the chamber 14 of the filter housing 10.

Figure 10:
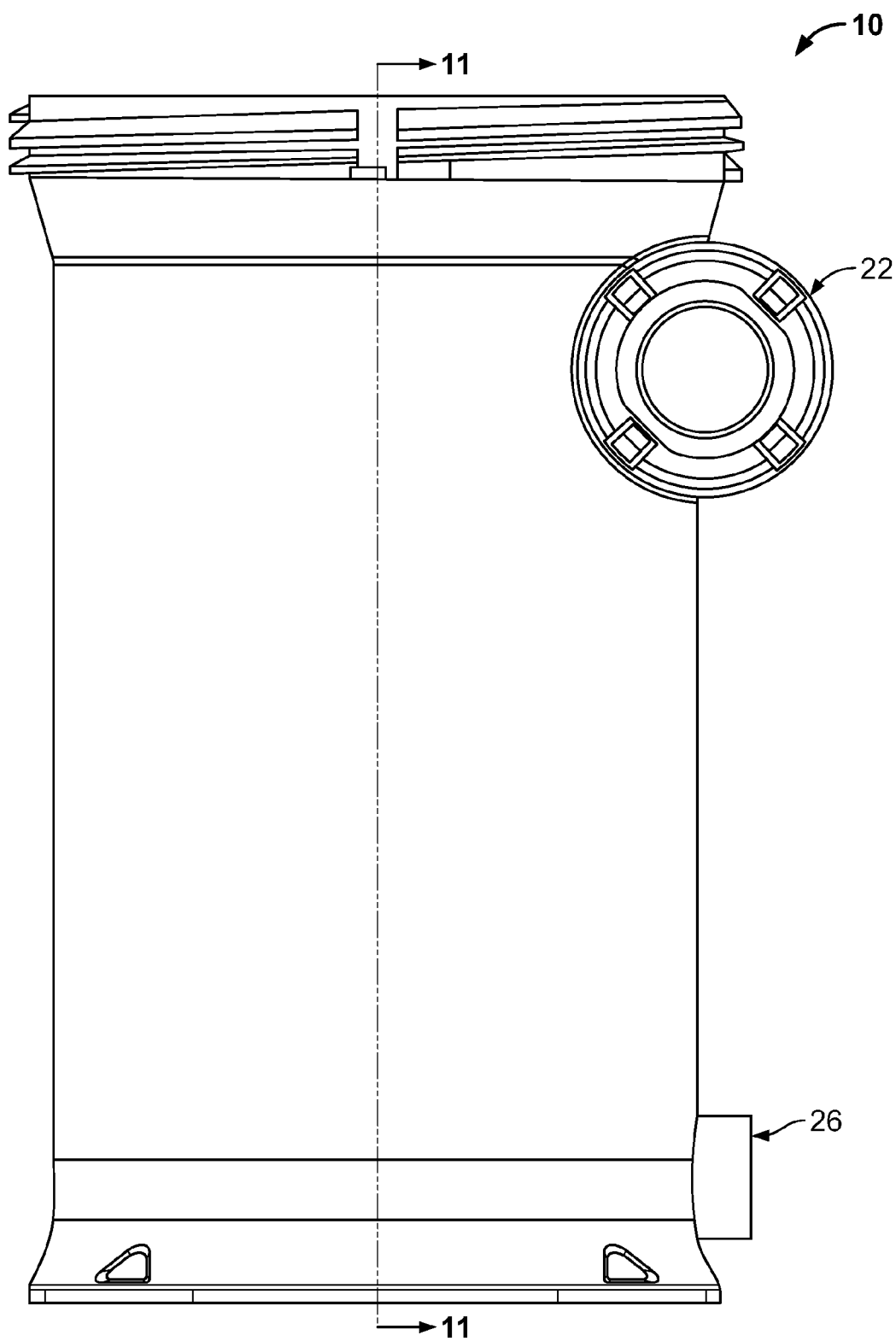
FIG. 10 is a front view of the pool filter housing.

FIG. 10 is a front view of the pool filter housing 10 showing the tangential inlet section 22 and the drain port 26.

Figure 11:
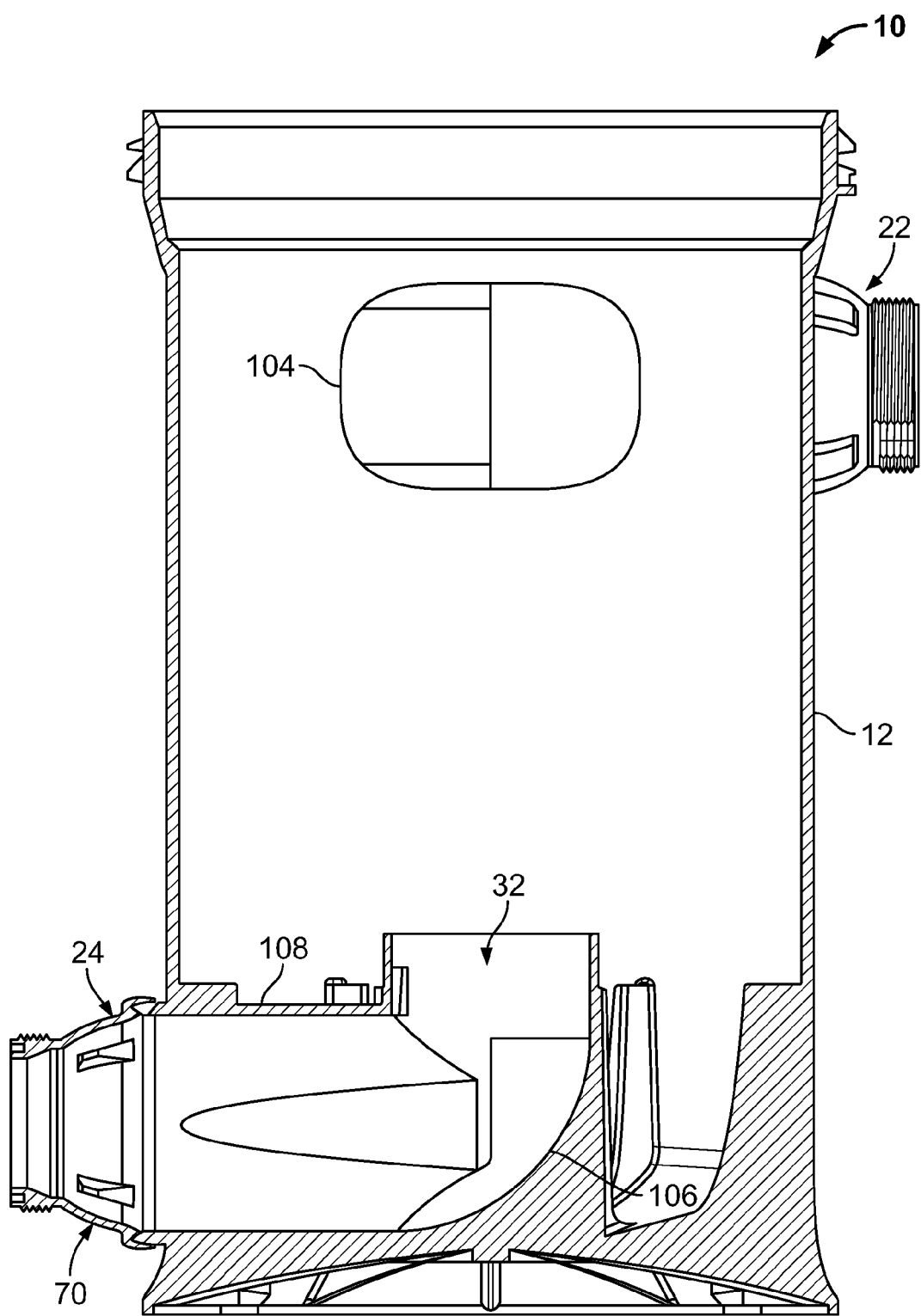
FIG. 11 is a sectional view of the pool filter housing taken along section line 11-11 of FIG. 10.

FIG. 11 is a sectional view of the pool filter housing 10 taken along section line 11-11 of FIG. 10. As shown, opening 104 into the interior of the chamber for the tangential inlet section 22 is horizontally elongated in order to compensate for the decreased cross-sectional area due to the shown embodiment of the diversion shield, as described above. Further, outlet channel 32 shows a curved portion 106 to direct the water flow through straight portion 108 to the flow controller 70 of radial outlet section 24.

Figure 12:
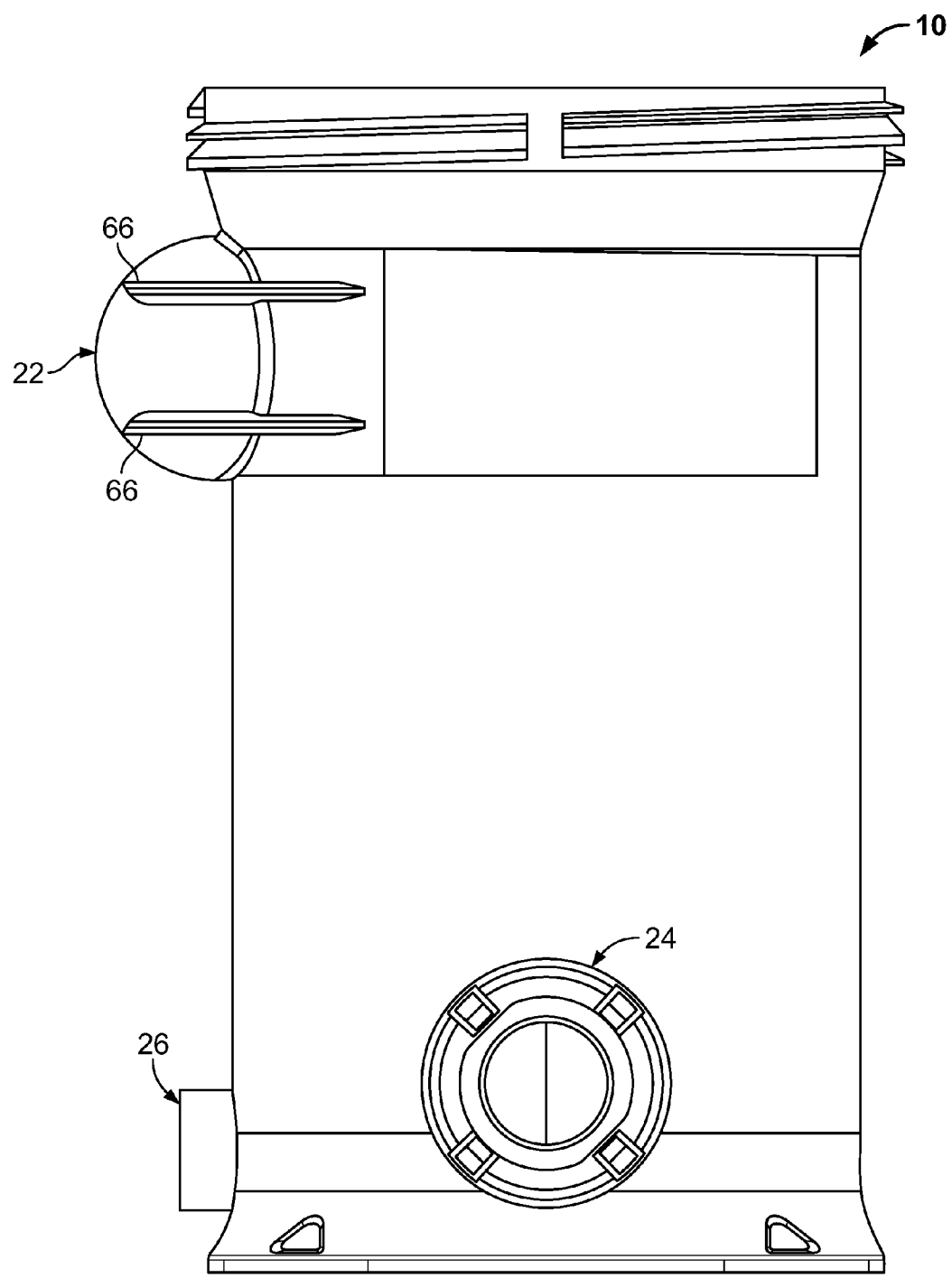
FIG. 12 is a rear view of the pool filter housing.

FIG. 12 is a rear view of the pool filter housing 10 showing tangential inlet section 22, radial outlet section 24, drain port 26, and support ribs 66, as described above.

Figure 13:
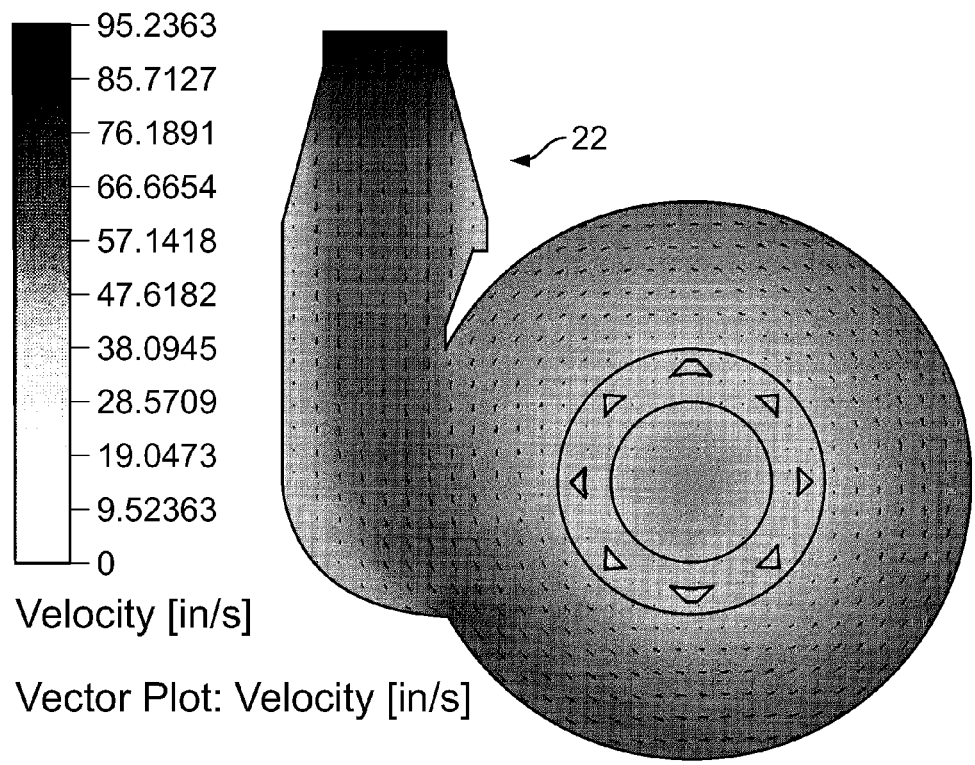
FIG. 13 is a view of the tangential inlet port displaying velocity distribution of fluid flow.
Figure 14:
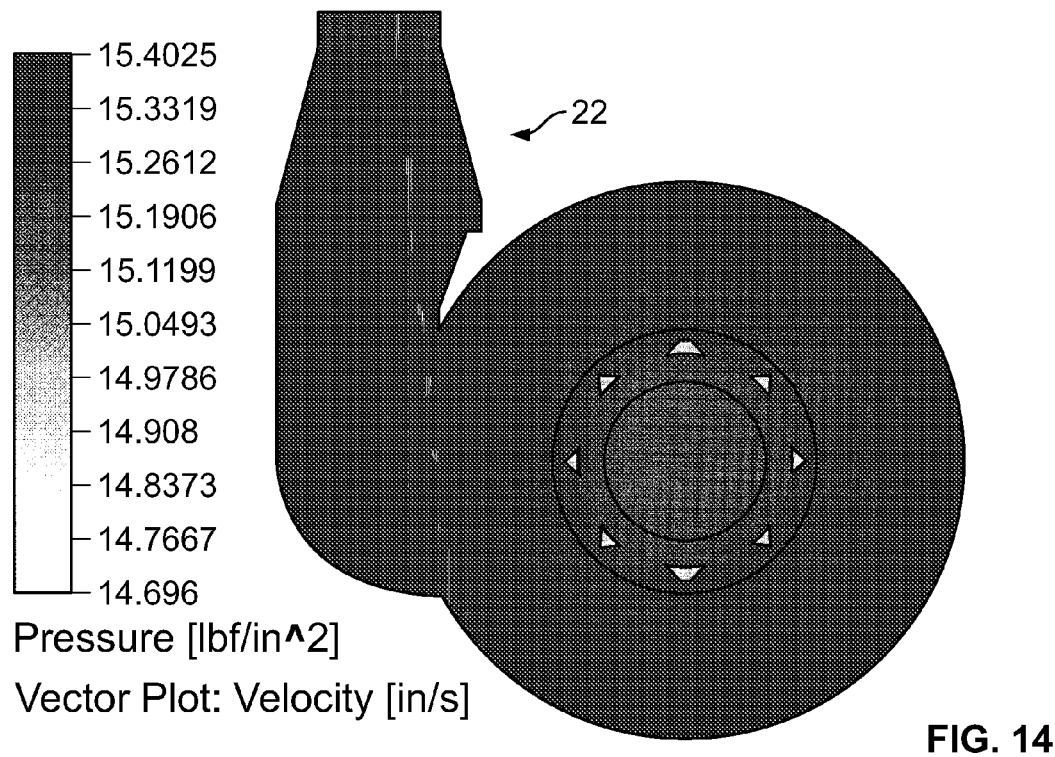
FIG. 14 is a view of the tangential inlet port displaying pressure distribution of fluid flow.
Figure 15:
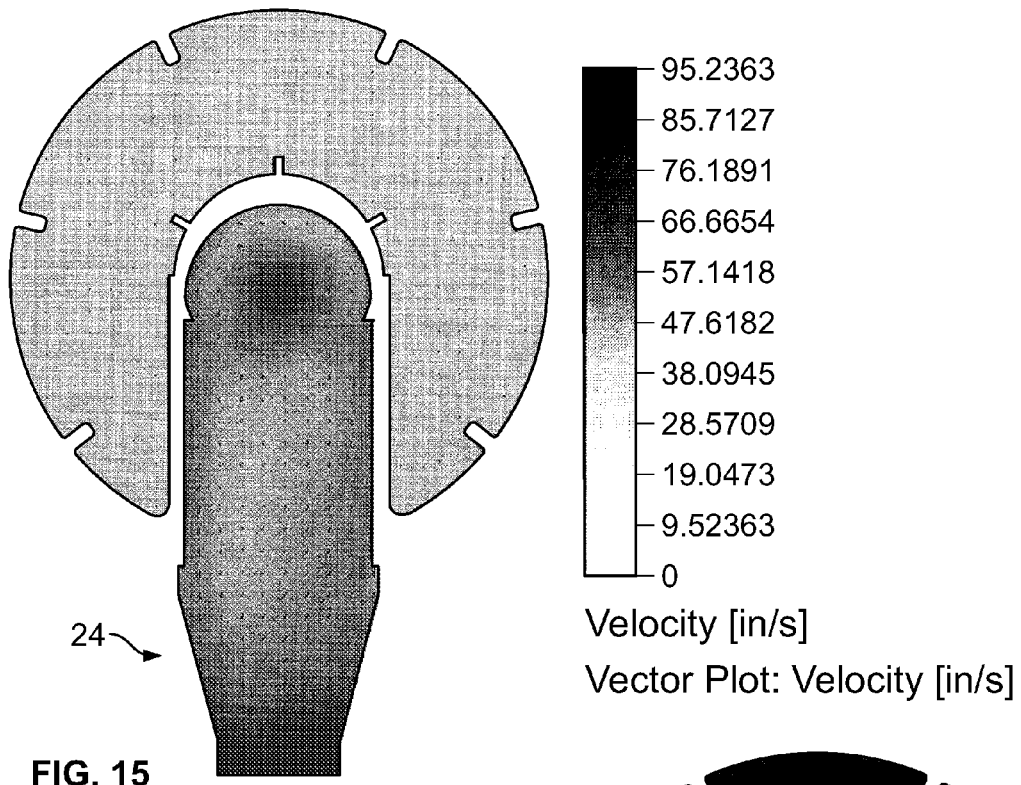
FIG. 15 is a view of the radial outlet port displaying velocity distribution of fluid flow.
Figure 16:
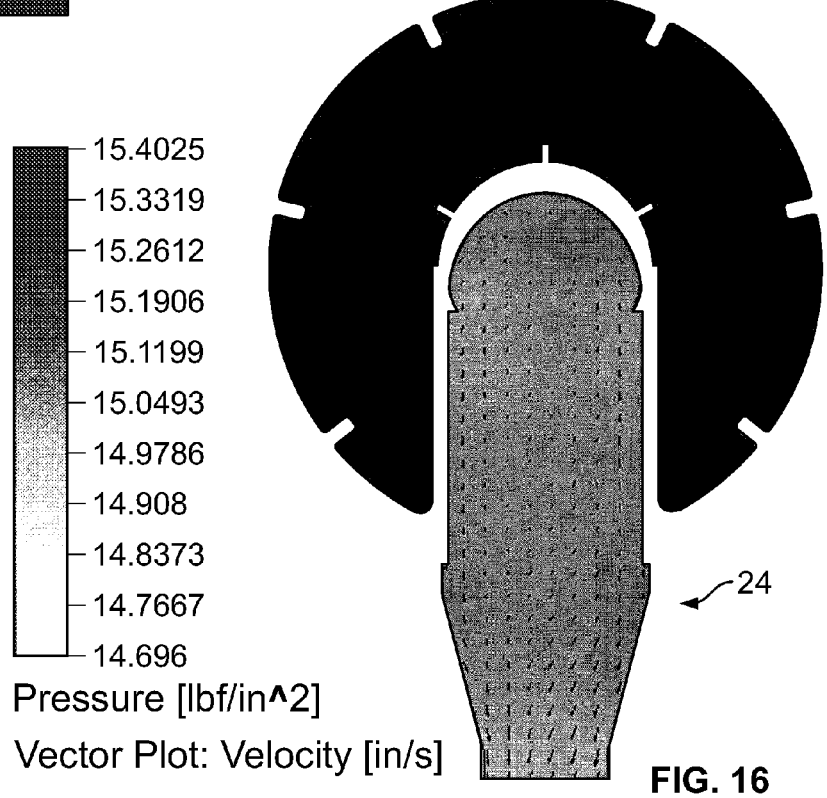
FIG. 16 is a view of the radial outlet port displaying pressure distribution of fluid flow.

FIGS. 13-16 are views displaying sample velocity and pressure distribution of fluid flow across the tangential inlet section 22 and the radial outlet section 24. More specifically, FIG. 13 is a view of the tangential inlet port displaying velocity distribution of fluid flow, FIG. 14 is a view of the tangential inlet port displaying pressure distribution of fluid flow, FIG. 15 is a view of the radial outlet port displaying velocity distribution of fluid flow, and FIG. 16 is a view of the radial outlet port displaying pressure distribution of fluid flow.

Figure 17:
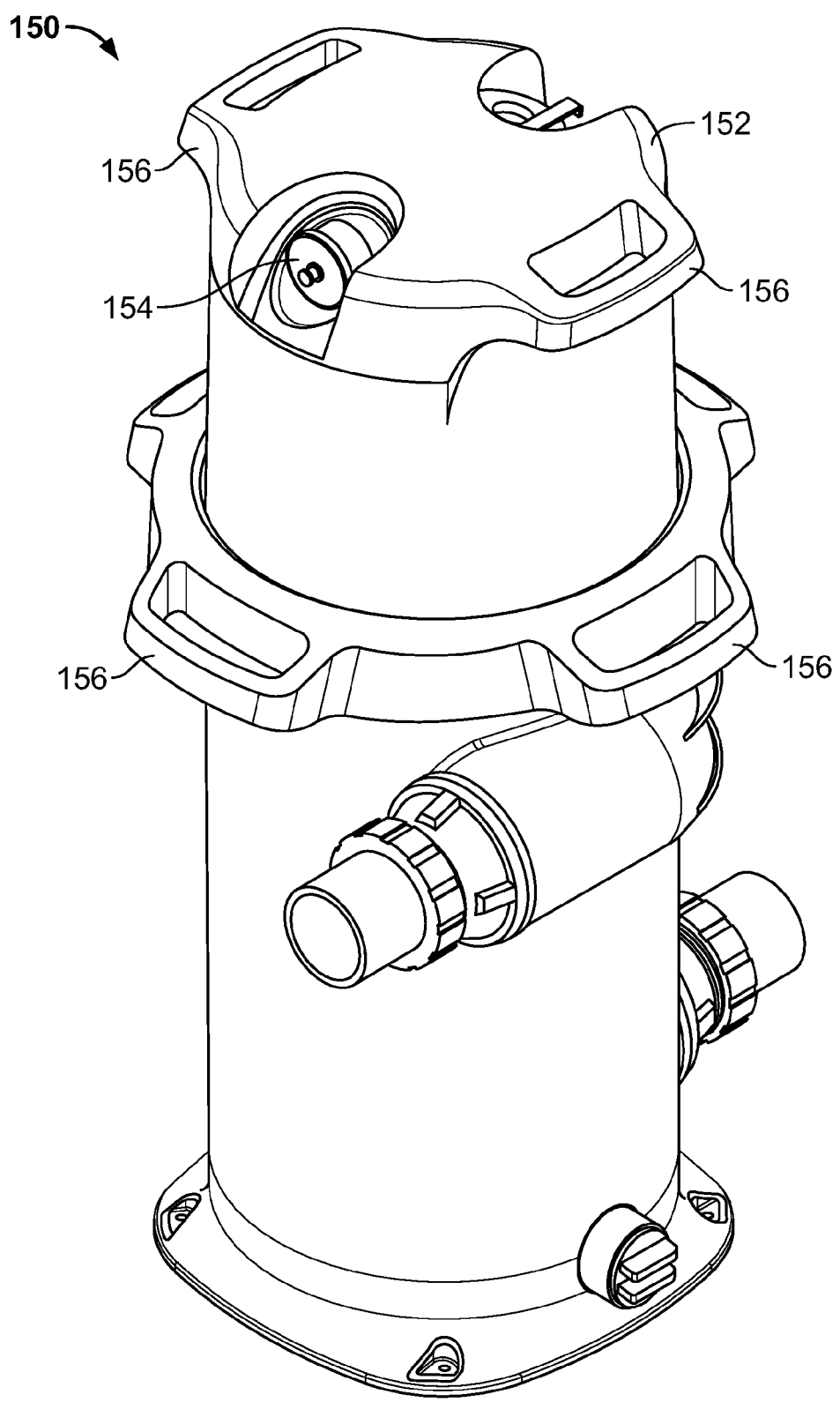
FIG. 17 is a perspective view showing an embodiment of the filter housing.

FIG. 17 is a perspective view showing an embodiment of the filter housing 150 with a cover 152 that is attached thereto and has handles 156. The filter housing 150 also includes a pressure gauge 154 for showing internal pressure, as well as a ring having a plurality of handles 156.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modifications without departing from the spirit and scope of the disclosure. All such variations and modifications, including those discussed above, are intended to be included within the scope of the disclosure.

The invention claimed is:

1. A pool filter comprising:
   a filter housing having a sidewall and a bottom wall defining an inner chamber;

an inlet section positioned in the sidewall of the filter housing;

an outlet section positioned in the sidewall of the filter housing; and a flow controller attached to the inlet section, the flow controller having a flow controller inlet, a flow controller outlet, and a wall therebetween, wherein the flow controller inlet has an inlet cross-sectional area and the flow controller outlet has an outlet cross-sectional area greater than the inlet cross-sectional area;

wherein the sidewall is cylindrical, and wherein the inlet section extends substantially tangential with respect to an outer circumference of said cylindrical sidewall.

2. The pool filter of claim 1, wherein the flow controller inlet is circular, the flow controller outlet is circular, and an inlet diameter of the flow controller inlet is smaller than an outlet diameter of the flow controller outlet.

3. The pool filter of claim 1, wherein the inlet section is configured to create rotating flow and includes a diversion shield configured to inhibit direct fluid flow onto a filter medium when the filter medium is positioned in the inner chamber of the filter housing.

4. The pool filter of claim 1, further comprising a drain port positioned in the sidewall of the filter housing.

5. The pool filter of claim 1, further comprising a filter cartridge positioned in the inner chamber of the filter housing.

6. The pool filter of claim 1, wherein the inlet section is positioned substantially normal with respect to the cylindrical sidewall so as to create rotating fluid flow within the filter housing.

7. A pool filter comprising:
a filter housing having a sidewall and a bottom wall defining an inner chamber;
at least one inlet section positioned in the sidewall of the filter housing;
an outlet section positioned in the sidewall of the filter housing; and
a means for increasing an effective inlet area;
wherein the sidewall is cylindrical, and wherein the inlet section extends substantially tangential with respect to an outer circumference of said cylindrical sidewall.

8. The pool filter of claim 7, wherein the means for increasing an effective inlet area includes two or more inlet ports.

9. The pool filter of claim 7, wherein the means for increasing an effective inlet area includes a flow controller attached to the at least one inlet section, the flow controller having a flow controller inlet, a flow controller outlet, and a wall therebetween, wherein the flow controller inlet has an inlet cross-sectional area and the flow controller outlet has an outlet cross-sectional area greater than the inlet cross-sectional area.

10. The pool filter of claim 9, wherein the flow controller inlet is circular, the flow controller outlet is circular, and an inlet diameter of the flow controller inlet is smaller than an outlet diameter of the flow controller outlet.

11. The pool filter of claim 7, wherein the inlet section is configured to create rotating flow and includes a diversion shield configured to inhibit direct fluid flow onto a filter medium when the filter medium is positioned in the inner chamber of the filter housing.

12. The pool filter of claim 7, further comprising a drain port positioned in the sidewall of the filter housing.

13. The pool filter of claim 7, further comprising a filter cartridge positioned in the inner chamber of the filter housing.

14. The pool filter of claim 7, wherein the inlet section is positioned substantially normal with respect to the cylindrical sidewall so as to create rotating fluid flow within the filter housing.

15. A pool filter comprising:
a filter housing having a sidewall and a bottom wall defining an inner chamber;
an inlet section positioned in the sidewall of the filter housing;
an outlet section positioned in the sidewall of the filter housing; and
a flow controller attached to the outlet section, the flow controller having a flow controller inlet, a flow controller outlet, and a wall therebetween,
wherein the flow controller inlet has an inlet cross-sectional area and the flow controller outlet has an outlet cross-sectional area smaller than the inlet cross-sectional area;
wherein the sidewall is cylindrical, and wherein the inlet section extends substantially tangential with respect to an outer circumference of said cylindrical sidewall.

16. The pool filter of claim 15, wherein the flow controller inlet is circular, the flow controller outlet is circular, and an inlet diameter of the flow controller inlet is larger than an outlet diameter of the flow controller outlet.

17. The pool filter of claim 15, wherein the inlet section is configured to create rotating flow and includes a diversion shield configured to inhibit direct fluid flow onto a filter medium when the filter medium is positioned in the inner chamber of the filter housing.

18. The pool filter of claim 15, further comprising a drain port positioned in the sidewall of the filter housing.

19. The pool filter of claim 15, further comprising a filter cartridge positioned in the inner chamber of the filter housing.

20. The pool filter of claim 15, wherein the inlet section is positioned substantially normal with respect to the cylindrical sidewall so as to create rotating fluid flow within the filter housing.

21. A pool filter comprising:
a filter housing having a sidewall and a bottom wall defining an inner chamber;
an inlet section positioned in the sidewall of the filter housing;
an outlet section positioned in the sidewall of the filter housing;
a first flow controller attached to the inlet section, the first flow controller having a first flow controller inlet, a first flow controller outlet, and a first wall therebetween, wherein the first flow controller inlet has a first inlet cross-sectional area and the first flow controller outlet has a first outlet cross-sectional area greater than the first inlet cross-sectional area; and
a second flow controller attached to the outlet section, the second flow controller having a second flow controller inlet, a second flow controller outlet, and a second wall therebetween, wherein the second flow controller inlet has a second inlet cross-sectional area and the second flow controller outlet has a second outlet cross-sectional area smaller than the second inlet cross-sectional area;
wherein the sidewall is cylindrical, and wherein the inlet section extends substantially tangential with respect to an outer circumference of said cylindrical sidewall.

22. The pool filter of claim 21, wherein the inlet section is configured to create rotating flow and includes a diversion shield configured to inhibit direct fluid flow onto a filter medium when the filter medium is positioned in the inner chamber of the filter housing.

23. The pool filter of claim 21, further comprising a drain port positioned in the sidewall of the filter housing.

24. The pool filter of claim 21, further comprising a filter cartridge positioned in the inner chamber of the filter housing.

25. The pool filter of claim 21, wherein the inlet section is positioned substantially normal with respect to the cylindrical sidewall so as to create rotating fluid flow within the filter housing.

26. A method for filtering fluid, comprising:
   providing a pool filter including:
   (a) a filter housing having a sidewall and a bottom wall defining an inner chamber,
   (b) an inlet section positioned in the sidewall of the filter housing,
   (c) an outlet section positioned in the sidewall of the filter housing,
   (d) a first flow controller attached to the inlet section, the first flow controller having a first flow controller inlet, a first flow controller outlet, and a first wall therebetween, wherein the first flow controller inlet has a first flow controller inlet cross-sectional area and the first flow controller outlet has a first flow controller outlet cross-sectional area greater than the first inlet cross-sectional area, and
   (e) a second flow controller attached to the outlet section, the second flow controller having a second flow controller inlet, a second flow controller outlet, and a second wall therebetween, wherein the second flow controller inlet has a second flow controller inlet cross-sectional area and the second flow controller outlet has a second flow controller outlet cross-sectional area smaller than the second inlet cross-sectional area;
   attaching the first flow controller inlet to a first pipe in fluid communication with a pool, the first pipe having a first pipe outlet cross-sectional area less than the first flow controller outlet cross-sectional area;
   attaching the second flow controller outlet to a second pipe in fluid communication with the pool, the second pipe having a second pipe inlet cross-sectional area less than the second flow controller inlet cross-sectional area; and
   filtering fluid through the pool filter from the first pipe to the second pipe;
   wherein the inlet section extends substantially tangentially with respect to an outer circumference of said sidewall creating a rotating fluid flow within the inner chamber of the filter housing of the pool filter.

27. The method of claim 26, wherein the pool filter includes a filter medium positioned in the inner chamber, and wherein the inlet section includes a diversion shield inhibiting direct fluid flow onto the filter medium.

\* \* \* \* \*